United States Patent
Kasapi et al.

(10) Patent No.: US 7,227,580 B2
(45) Date of Patent: Jun. 5, 2007

(54) KNIFE EDGE TRACKING SYSTEM AND METHOD

(75) Inventors: Steven Kasapi, San Francisco, CA (US); Amit Nabarro, Sunnyvale, CA (US); Ofir Baharav, Los Altos Hills, CA (US)

(73) Assignee: Credence Systems Corporation, Milpitas, CA (US)

( * ) Notice: Subject to any disclaimer, the term of this patent is extended or adjusted under 35 U.S.C. 154(b) by 749 days.

(21) Appl. No.: 10/719,880

(22) Filed: Nov. 20, 2003

(65) Prior Publication Data

US 2005/0110893 A1     May 26, 2005

(51) Int. Cl.
*G03B 7/00* (2006.01)
*G01R 31/02* (2006.01)
(52) U.S. Cl. .................... 348/362; 324/754; 324/758
(58) Field of Classification Search ........ 348/362–368, 348/187, 125; 324/537, 752, 754, 758; 250/208.1; 356/39, 69; 382/125, 126, 129
See application file for complete search history.

(56) References Cited

U.S. PATENT DOCUMENTS

| | | | |
|---|---|---|---|
| 6,608,494 B1 | 8/2003 | Bruce et al. | |
| 6,621,275 B2 * | 9/2003 | Cotton et al. | ................ 324/537 |
| 6,788,093 B2 | 9/2004 | Aitren et al. | |

\* cited by examiner

*Primary Examiner*—David Ometz
*Assistant Examiner*—Tuan Le
(74) *Attorney, Agent, or Firm*—Sughrue Mion. PLLC; Joseph Bach

(57) ABSTRACT

A system and method for automatically and accurately determining the exact location of a knife-edge, such as an edge of an optical shutter, so that it can be controlled automatically. In one aspect the system comprises a mechanized shutter coupled to a shutter controller that can automatically control the shutter's location and movement. According to one implementation of the shutter controller the system takes a first image at a first shutter position. The shutter is then moved a predetermined about and a second image is taken. Then, the pixels of each image are added in the direction perpendicular to the movement of the shutter, so as to provide two one-dimension functions. A linear difference of the functions is then taken, so as to obtain a one-dimensional linear difference function. A peak in the linear difference function is then identified as the location of the shutter.

12 Claims, 4 Drawing Sheets

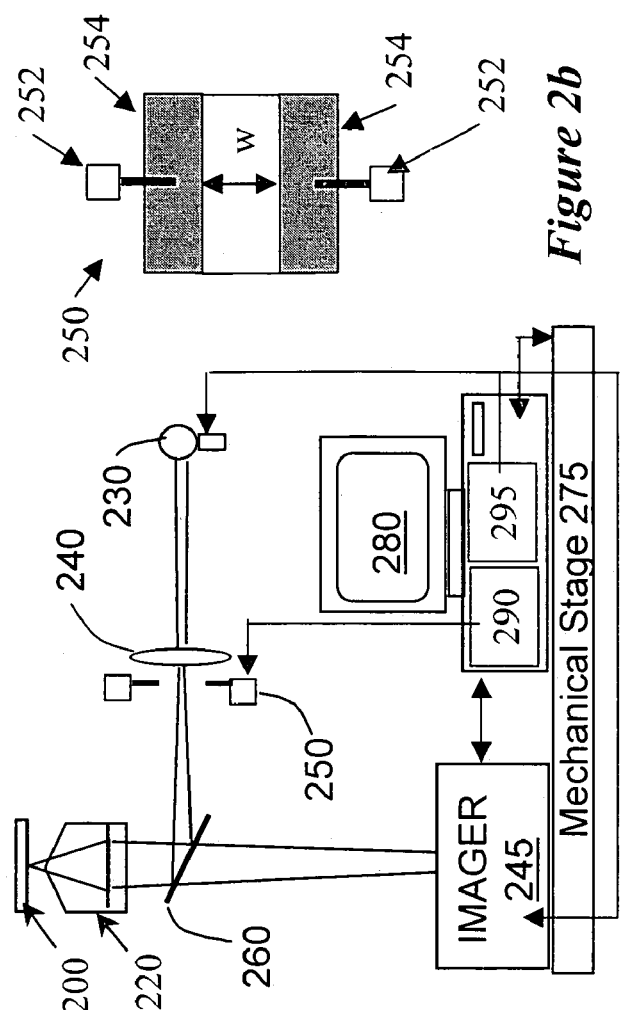
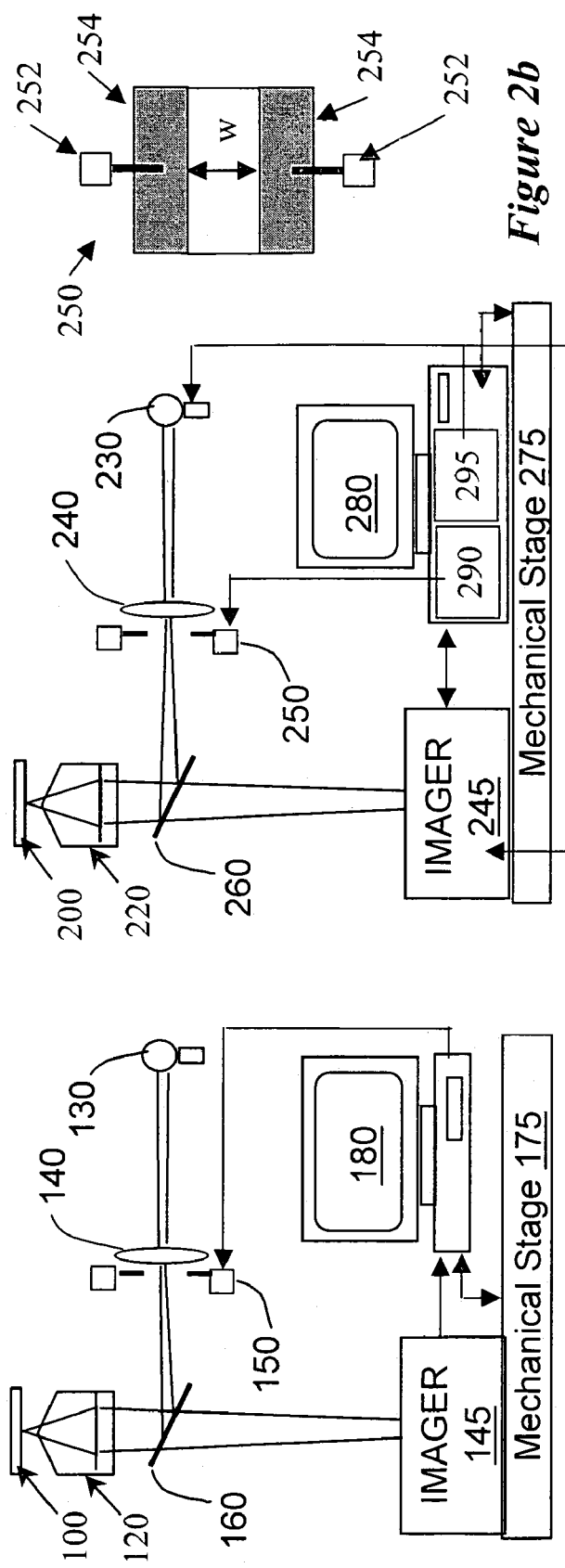
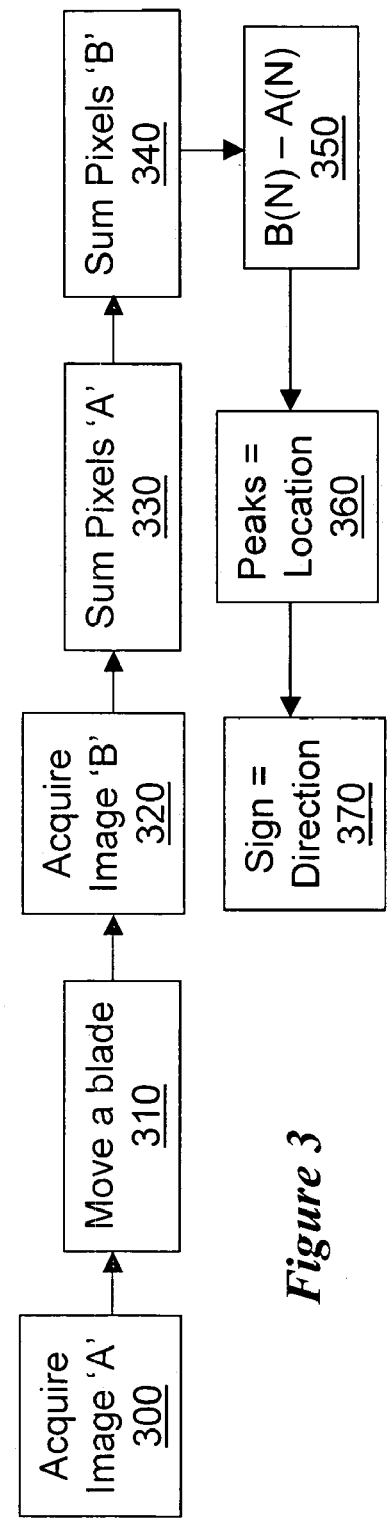

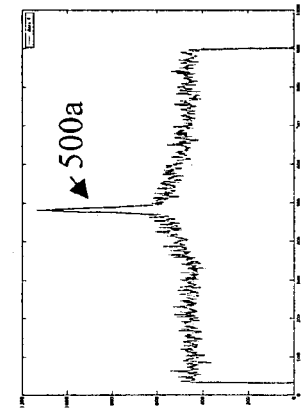
*Figure 5a*
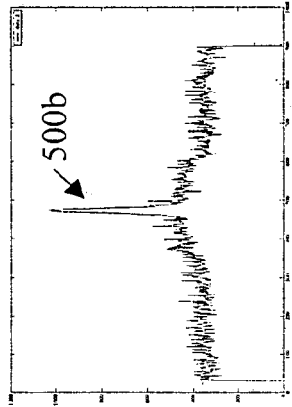
*Figure 5b*
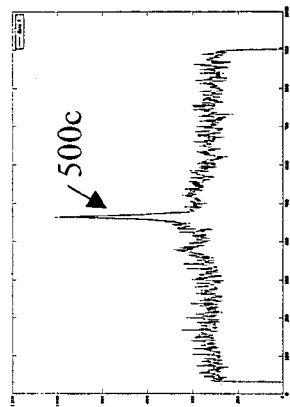
*Figure 5c*
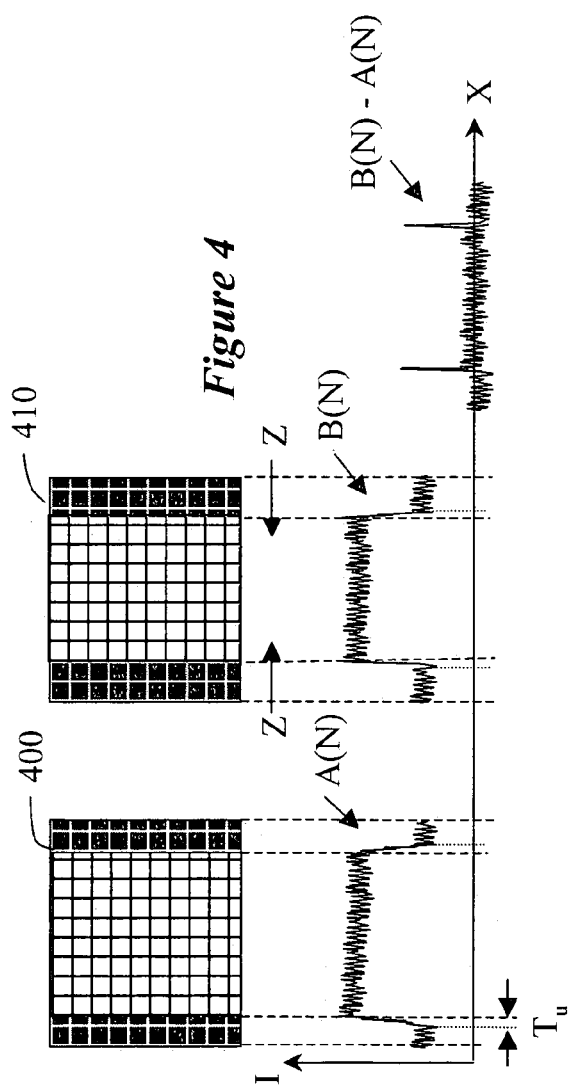
*Figure 4*
*Figure 5d*

KNIFE EDGE TRACKING SYSTEM AND METHOD

BACKGROUND OF THE INVENTION

1. Field of the Invention

The present invention relates to a method and a system for locating and tracking the location of a knife-edge, such as the edge of a shutter blade in an optical system.

2. Description of the Related Art

Knife-edges are used in various apparatus, such as, an optical apparatus. In various such applications, the exact location and movement of the knife-edge needs to be determined accurately within the image plane. One example is an optical shutter, where the knife-edge may define the field of view of the optical system. In order to automate a shutter system, the location and movement of the shutter needs to be located and monitored automatically.

An example of an optical apparatus that uses a shutter is depicted in FIG. 1. In FIG. 1, and object to be inspected, 100, e.g., a semiconductor integrated circuit, is illuminated through and imaged by collection optics 120. That is, light from light source 130 is passed through field lens 140, shutter 150 (both the field lens and the shutter are at an intermediate image plane), partially-reflecting mirror 160, and into collection optics 120, so as to illuminate particular area of the object 100. Light reflected from the object 100 is collected by optics 120, passed through partially-reflecting mirror 160 and is imaged by imager 145. The images are sent to computer 180. The entire arrangement is positioned on mechanical stage 175, which is controlled by computer 180.

In order to select a particular area of the object 100 to be imaged, shutter 150 is adjusted so that only that particular area is illuminated. More specifically, shutter 150 is mechanized and a user may control its position via computer 180. That is, an image is taken and, after inspecting the image, the user may decide to increase or decrease the field of view. The user then enters a corresponding command to the computer, and the computer causes the shutter to move a particular amount according to the entries made by the user.

As can be appreciated having the user adjust the field of view in such a step-wise, trial and error method is time consuming and inaccurate. Moreover, once the particular field of view has been achieved and an image taken, it may still be unclear what is the exact size of the filed of view. Additionally, if a second picture of another location is needed to be at the same field of view, the entire sequence needs to be repeated and, even then it is not clear that the exact same field of view has been achieved. Finally, as can be understood, having the user verify the field of view prevents the system from being fully automated.

There are mechanical systems for monitoring the position of objects, such as linear encoders. However, such encoders only measure distance relative to the mechanical assembly in the intermediate image plane, not in the plane of the imaging detector itself where the image is detected.

What is needed is means to track the blade position using the image. With such a system a user could, for example, draw a box on the system's display screen and have the shutters move so that the edges of the shutters coincide with the box drawn by the user. The user could also adjust the edges of the box spatially and have the shutters track the positions of the drawn box edges.

What is also needed is a way to detect the shutter blade positions in the image plane.

SUMMARY

The present invention provides a commercially viable system and method for automatically and accurately determining the exact location of a knife-edge, such as an edge of an optical shutter, so that it can be controlled automatically. The present invention further provides a system and method for automatically and accurately controlling the movement of a knife-edge, such as a shutter. Additionally, the present invention provides a system and method for automatically and accurately selecting an optical field of view using a mechanized shutter.

In one aspect of the invention the system comprises a mechanized shutter coupled to a computer. The computer includes a shutter controller that can automatically control the shutter's location and movement. According to one implementation of the shutter controller the system takes a first image at a first shutter position. The shutter is then moved a predetermined amount and a second image is taken. Then, the pixels of each image are added in the direction perpendicular to the movement of the shutter, so as to provide two one-dimension functions. A linear difference of the functions is then taken, so as to obtain a one-dimensional linear difference function. A peak in the linear difference function is then identified as the location of the shutter.

According to another aspect of the invention a differential function is used to more accurately identify the location of the shutter. That is, once the linear difference function is obtained, it is differentiated so as to obtain a one dimensional differential function having two peaks: one identifying the maximum slop of the leading edge of the peak of the linear difference function, and one (of opposite sign) identifying the maximum slope of the trailing edge of the peak of the linear difference function. Each edge of the differential function indicates the location of the shutter at one of the images.

According to yet another feature of the invention the system further includes a gain/illumination controller. In one implementation, the gain/illumination controller inspects the peak in the linear difference function to determine its "quality." The "quality" can be determined in terms of, for example, signal to noise ratio. If the quality of the peak is insufficient, the system increases the gain or the illumination. In one illustrative embodiment a gain limit is provided so that the gain cannot be raised beyond the gain limit, so as not to cause an unacceptably low signal to noise ratio. Similarly, illumination level limits may be provided so as not to cause the illumination to be too low or too high.

BRIEF DESCRIPTION OF THE DRAWINGS

The invention is described herein with reference to particular embodiments thereof, which are exemplified in the drawings. It should be understood, however, that the various embodiments depicted in the drawings are only exemplary and may not limit the invention as defined in the appended claims.

FIG. 1 is a general schematic depicting major components of a prior art optical system that uses a mechanized shutter.

FIG. 2a is a general schematic depicting major components of an optical system embodying an embodiment of the invention; while FIG. 2b depicts an example of a mechanized shutter according to an embodiment of the invention.

FIG. 3 is a flow chart depicting a method for determining a shutter location according to an embodiment of the invention.

FIG. 4 depicts images and functions obtained using the method of FIG. 3.

FIGS. 5a–d depict examples of actual data obtain in a set-up used to accurately locate a knife-edge according to an embodiment of the invention.

DETAILED DESCRIPTION

Figure 7:
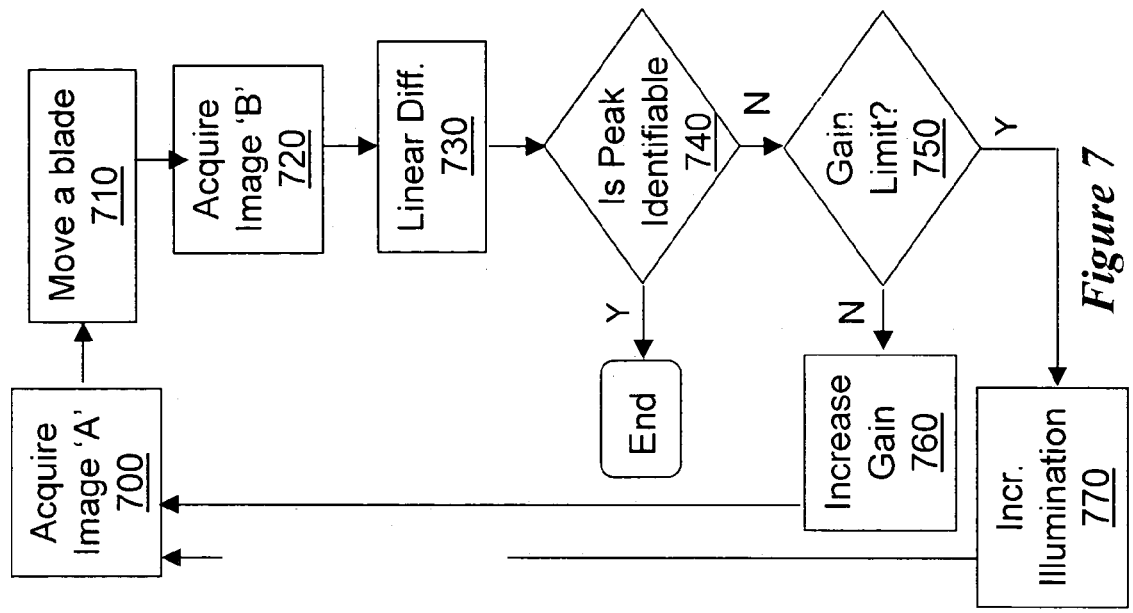
FIG. 7 is a flow chart illustration the operation of the gain/illumination controller according to an embodiment of the invention.

FIG. 2a depicts an optical system very similar to that depicted in FIG. 1, except that it incorporates embodiments of the present invention. More particularly, as can be seen in FIG. 2a, computer 280 incorporates a shutter controller 290 coupled to the shutter mechanism 250, and a gain/illumination controller 295 coupled to the illumination source 230 and the imager 245. In this system the user may enter the required field of view, and the shutter controller would control the shutter to the appropriate position for that field of view. Similarly, for every image, the shutter controller can provide the user with the field of view used for that image. Accordingly, this embodiment of the invention enables better control of the shutter position. As can be seen in FIG. 2b, in one example the mechanized shutter 250 is made of two shutter plates 254, which are controllably movable by servomotors 252. The servomotors 252 are controlled by shutter controller 290.

The construction and operation of shutter controller 290 will now be described with reference to FIGS. 3 and 4. FIG. 3 is a flow chart depicting a method for automatically determining a shutter location according to an embodiment of the invention. FIG. 4 depicts images and functions obtained using the method of FIG. 3. Referring to FIG. 3, the system first acquires an image 400 at a particular Shutter setting (Step 300). As can be appreciated, the image may have various features causing variation in the intensity level for each pixel of the image. For example, if the object imaged is an integrated circuit, various features of the circuit, such as metal lines and device structures, would cause various pixels to be illuminated with different intensity. Looking at the image, humans may be able to resolve the obtained picture; however, it is very difficult to decipher the exact location of the shutter. Moreover, in order to provide an automatic shutter, the system itself needs to be able to resolve the image and determine where the shutter edge is.

Figure 8:
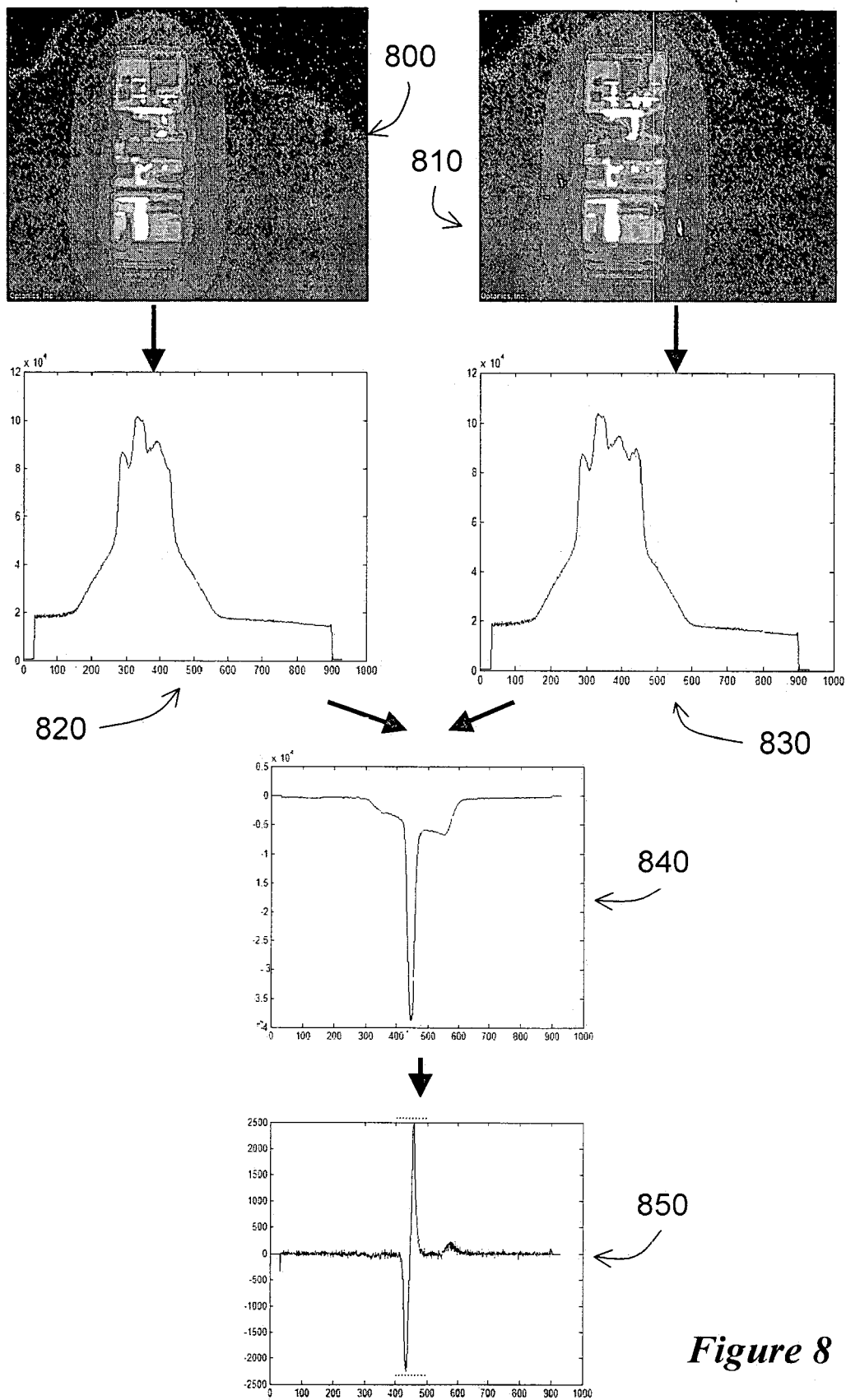
FIG. 8 depicts an example of the operation of the inventive system.

Additionally, while in the illustration of FIG. 4 the edge between the dark area and the bright areas of the picture seems sharp, in reality there's an area of gradual change from dark to bright, as indicated by label $T_u$ (see, e.g., actual images in FIG. 8). Consequently, the actual location of the edge of the shutter with respect to the picture is uncertain and is not easily duplicated. Therefore, the system needs to be able to follow a certain protocol to determine the exact location of the shutter edge with respect to the image taken.

To identify the exact location of the blade, the process proceeds as follows. The blade of the shutter is moved a selected amount at Step 310 (i.e., the shutter controller 290 sends a signal to the servo motors 252 of the shutter to move an amount corresponding to the signal—see arrows Z—Z). Then, a second image 410 is taken (Step 320). At step 330, a function A(N) is obtained from image 400. Function A(N) is a sum of the pixels in image 400 along the axis perpendicular to the direction of motion of the shutter so as to create a one dimension (1-D) function A(N). Similarly, at step 340 a 1-D function BN) is generated from image 410. Then, in step 350 the difference of the two functions is obtains, i.e., B(N)—A(N). As shown in FIG. 4, the linear difference of the functions is another 1-D function having generally two sharp peaks. These peaks accurately identify the location of the edges of the shutter (Step 360). Also, the sign of the peaks (i.e., positive or negative) indicates the direction of motion of the shutter in step 310.

As can be appreciated, the method described herein can be used to automatically and accurately identify the exact location of any knife-edge using an optical system such as the one described herein. An example of actual data obtain in a set-up used to accurately locate a knife edge is shown in FIGS. 5a–d. Specifically, FIG. 5a is a plot of a linear difference data of two 1-D functions of two images, with a movement of a single knife-edge between the two images. The knife-edge was then moved again and a third image was taken. The linear difference between the third and the second image functions is plotted in FIG. 5b. The knife-edge was then moved a third time and a fourth image taken. The linear difference between the fourth and third image functions is plotted in FIG. 5c. FIG. 5d is a superimposition of FIGS. 5a–5c.

The x-axis in FIG. 5d is noted in pixels. Looking at the three peaks, one gets peaks at 482.0; 473.6; and 464.4. For the particular experimental system used to obtain the data of FIGS. 5a–5d, one micrometer (μm) equals 7.22 pixels. As can be seen from the data of FIGS. 5a–5d, the movement between the images is an average of about 1.2 μm. Accordingly, the system is capable of automatically determining the location of the knife-edge to a sub-micron accuracy.

If an increased accuracy is required, an optional secondary procedure may be followed. More specifically, if the linear difference peak is examined at higher magnitude, one can see that it has a definite width. That can be easily confirmed by comparing each of the peaks of FIGS. 5a–5c, to their replication in higher magnitude in FIG. 5d. For example, in FIG. 5a peak 500a seems very narrowly defined. However, when magnified and plotted as in FIG. 5d, peak 500a has a defined width. In order to obtain higher accuracy, one needs to define what part of the peak correlates to the knife-edge. According to one embodiment of the invention, this is obtained by taking the derivative of the linear difference equation.

Figure 6:
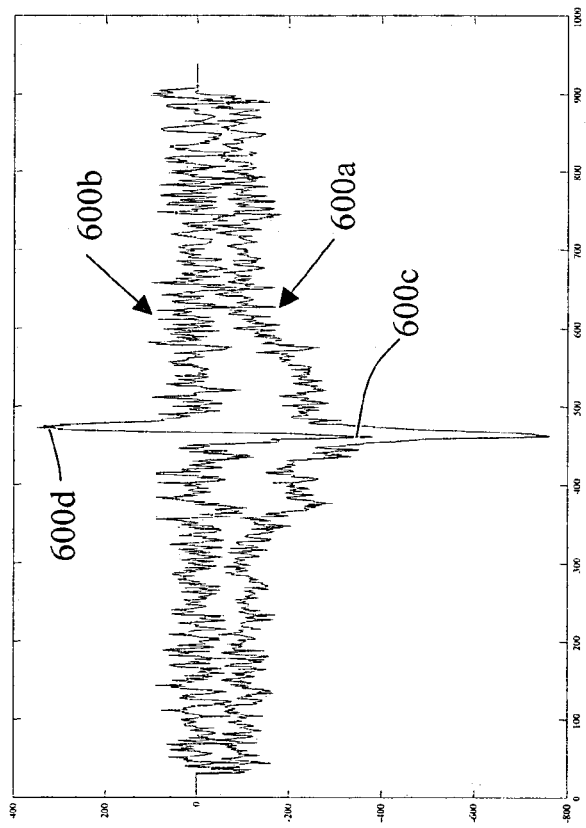
FIG. 6 is a plot of an actual data taken for a single shutter using an embodiment of the invention.

That is, by taking the derivative of the linear difference equation, one would get two new peaks—one corresponding to the maximum slope on the leading edge of the linear difference peak, and one corresponding to the maximum slope of the trailing edge of the linear difference peak. This is demonstrated in FIG. 6. FIG. 6 is a plot of an actual data taken for a single shutter using an embodiment of the invention. In FIG. 6, plot 600a is that of the linear difference function, while plot 600b is that of the differential of the linear difference plot 600a. Using this approach, one can define one peak, e.g., 600c, of the derivative plot as the start of movement of the shutter, while the second, e.g., 600d, as the end of motion of the shutter. Thus, one peak defines the shutter position at one picture and the other peak defines the shutter position at the second picture.

As with all optical systems, the accuracy of the system depends on the signal to noise S/N ratio. Notably, the data plotted in FIGS. 5 and 6 has relatively good signal to noise ratio, enabling accurate determination of the peak location. However, depending on the object imaged, the peak may not be easily identifiable. Therefore, according to another embodiment the system is provided with automatic gain and illumination control, depicted in FIG. 2a as controller 295.

The operation of the gain/illumination controller 295 will now be explained with reference to FIG. 7. In Step 700 the system takes an image 'A', then moves the blade in Step 710, and takes another image 'B' in Step 720. It then calculates a linear difference function in Step 730 and check to see whether a peak is easily identifiable in Step 740. If so, the procedure ends. In not, the system checks to see whether a gain limit has been reached in Step 750. If not, the system increases the camera (e.g. CCD) gain in Step 760 and proceeds to Step 700. The increase can be in a preset constant or variable amount. If in Step 750 it has been determined that a predetermined gain limit has been reached, the system increases the illumination in Step 770 and proceeds to Step 700. Optionally, a predetermined illumination limit may also be set.

In another embodiment of the invention, the blades are not rectilinear, but may be another shape, such as a trapezoid or a circle. The same technique can be applied, but in this case the summation should be along a path perpendicular to the direction of motion of each point on the blade. In the case of a circular aperture, for example, the two images would be taken at different aperture openings, the intensities at each point would be added along a circle of varying radius centered at the center of the aperture to produce a one-dimensional function, and finally the two one-dimensional functions would be subtracted to determine the radius of the opening of the aperture. This technique may be generalized to an assembly of arbitrary geometrical description.

FIG. 8 depicts an example of actual shutter tracking according to an embodiment of the invention. In FIG. 8, a first image is shown at 800 and its one-dimension function at 820. A second image is shown at 810 and its one-dimension function at 830. The difference function is plotted at 840 and its derivative is plotted at 850. From plot 850 one can determine observe that the first image was taken with the shutter positioned at 430, while the second image was taken with the shutter positioned at 453. The difference of the maximum and minimum peaks shows the size of the motion step to be 23 microns. Using the conversions of one micron being 7.22 pixels, one gets the shutter motion between the images to be 166 pixels.

As can be seen from the above examples, in one aspect of the invention tracking of the shutter is improved and is automated by providing a controller for determining and controlling a motion of the mechanized shutter. The controller receives a first data set corresponding to a first image obtained through a first position of the shutter, and a second data set corresponding to a second image obtained through a second position of the shutter. The controller then obtains a first function by performing an arithmetic operation on the first data set; and a second function by performing an arithmetic operation on the second data set. A difference function is then obtained by subtracting the first function from the second function, so as to obtain a recognizable peak in the difference function. A further resolution can be obtained by obtaining the derivative of the difference function.

While the invention has been described with reference to particular embodiments thereof, it is not limited to those embodiments. Specifically, various variations and modifications may be implemented by those of ordinary skill in the art without departing from the invention's spirit and scope, as defined by the appended claims. Additionally, all of the above-cited prior art references are incorporated herein by reference.

What is claimed is:

1. A method for automatically determining a location of a shutter in a system having an illumination source, an optical imager and a mechanized shutter, comprising the steps of:
   placing the shutter at a first position and forming a first image through the shutter;
   placing the shutter at a second position and forming a second image through the shutter;
   obtaining a first function by summing the pixels of the first image in a direction perpendicular to the shutter's direction of motion;
   obtaining a second function by summing the pixels of the second image in a direction perpendicular to the shutter's direction of motion;
   obtaining a difference function by subtracting the first function from the second function, so as to obtain a recognizable peak in said difference function.

2. The method of claim 1, further comprising the step of taking the derivative of the difference equation.

3. The method of claim 1, further comprising adjusting one of (i) gain of said imager and (ii) intensity of said illumination source, so as to obtain an acceptable signal to noise ratio.

4. The method of claim 3, wherein said adjusting comprises the step of:
   examining the quality of said peak and if the quality is not acceptable: checking whether a gain limit has been reached and, if so, increasing the intensity of said illumination source; otherwise increasing the gain of said imager.

5. A system for automatically determining a location of a shutter, comprising: an
   illumination source;
   an optical imager;
   a mechanized shutter;
   a controller comprising a shutter controller preprogrammed to perform the step comprising:
   placing the shutter at a first position and forming a first image through the shutter;
   placing the shutter at a second position and forming a second image through the shutter;
   obtaining a first function by summing the pixels of the first image in a direction perpendicular to the shutter's direction of motion;
   obtaining a second function by summing the pixels of the second image in a direction perpendicular to the shutter's direction of motion;
   obtaining a difference function by subtracting the first function from the second function, so as to obtain a recognizable peak in said difference function.

6. The system of claim 5, wherein said shutter controller is further programmed to perform the step comprising: taking the derivative of the difference function.

7. The system of claim 5, further comprising an automatic gain/illumination controller.

8. The system of claim 7, wherein said gain/illumination controller is preprogrammed to perform the steps comprising: examining the quality of said peak and if the quality is not acceptable: checking whether a gain limit has been reached and, if so, increasing the intensity of said illumination source; otherwise increasing the gain of said imager.

9. A controller for determining and controlling a motion of a mechanized shutter, said controller performing the operations comprising:
   receiving a first data set corresponding to a first image obtained through a first position of the shutter;
   receiving a second data set corresponding to a second image obtained through a second position of the shutter;
   obtaining a first function by performing an arithmetic operation on the first data set;
   obtaining a second function by performing an arithmetic operation on the second data set;

obtaining a difference function by subtracting the first function from the second function, so as to obtain a recognizable peak in said difference function.

10. The controller of claim 9, further performing the operation comprising: taking the derivative of the difference function.

11. The controller of claim 9, further performing the operation comprising adjusting one of (i) gain of an imager and (ii) intensity of an illumination source, so as to obtain an acceptable signal to noise ratio.

12. The controller of claim 11, wherein the operation of adjusting comprises the step of:

examining the quality of said peak and if the quality is not acceptable: checking whether a gain limit has been reached and, if so, increasing the intensity of said illumination source; otherwise increasing the gain of said imager.

* * * * *